(12) United States Patent
Jang et al.

(10) Patent No.: US 11,112,976 B2
(45) Date of Patent: Sep. 7, 2021

(54) DATA STORAGE DEVICE THAT STORES MULTIPLE VALUES CORRESPONDING TO MULTIPLE KEYS IN A PAGE

(71) Applicant: SAMSUNG ELECTRONICS CO., LTD., Suwon-si (KR)

(72) Inventors: Hyung Chul Jang, Suwon-si (KR); Jae Ju Kim, Suwon-si (KR); Young-Ho Park, Anyang-si (KR); Chan Soo Kim, Seoul (KR); Ju Pyung Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/362,733

(22) Filed: Mar. 25, 2019

(65) Prior Publication Data
US 2019/0332283 A1    Oct. 31, 2019

(30) Foreign Application Priority Data
Apr. 26, 2018    (KR) .................. 10-2018-0048519

(51) Int. Cl.
*G06F 3/06*    (2006.01)
*G06F 12/02*    (2006.01)

(52) U.S. Cl.
CPC .......... *G06F 3/0619* (2013.01); *G06F 3/0644* (2013.01); *G06F 3/0656* (2013.01); *G06F 3/0658* (2013.01); *G06F 3/0688* (2013.01); *G06F 12/0246* (2013.01); *G06F 2212/7201* (2013.01); *G06F 2212/7207* (2013.01)

(58) Field of Classification Search
CPC .. G06F 3/0679; G06F 3/0688; G06F 12/0246; G06F 2212/72–7211
See application file for complete search history.

(56) References Cited

U.S. PATENT DOCUMENTS

| | | |
|---|---|---|
| 7,653,798 B2 | 1/2010 | Kim et al. |
| 8,443,136 B2 | 5/2013 | Frost et al. |
| 8,966,156 B2 | 2/2015 | Cheon |
| 9,075,710 B2 | 7/2015 | Talagala et al. |
| 9,292,435 B2 * | 3/2016 | Lee .................... G06F 12/0292 |
| 9,329,991 B2 | 5/2016 | Cohen et al. |
| 9,507,523 B1 | 11/2016 | Mullendore et al. |

(Continued)

OTHER PUBLICATIONS

Jin et al. "KAML: A Flexible, High-Performance Key-Value SSD." Feb. 2017. IEEE. HPCA 2017. pp. 373-384.*

(Continued)

*Primary Examiner* — Nathan Sadler
(74) *Attorney, Agent, or Firm* — Volentine, Whitt & Francos, PLLC

(57) ABSTRACT

A data storage device includes a non-volatile memory, including a first region and a second region different from the first region, and a controller which stores first and second data in a first region of the non-volatile memory. The first region of the non-volatile memory includes first and second storage regions. A part of the first data is stored in the first storage region, and another part of the first data is stored in the second storage region. The second data is stored in the second storage region, and an offset value of the second storage region in which the second data is started is stored in the second region of the non-volatile memory.

20 Claims, 18 Drawing Sheets

(56) References Cited

U.S. PATENT DOCUMENTS

| | | | |
|---|---|---|---|
| 2007/0192534 A1* | 8/2007 | Hwang | G06F 3/0611 |
| | | | 711/103 |
| 2008/0282023 A1* | 11/2008 | Biswas | G06F 12/0246 |
| | | | 711/103 |
| 2011/0320689 A1 | 12/2011 | Cho et al. | |
| 2016/0070480 A1* | 3/2016 | Babu | G06F 16/2246 |
| | | | 711/114 |
| 2018/0307620 A1* | 10/2018 | Zhou | G06F 3/0608 |
| 2019/0004726 A1* | 1/2019 | Li | G06F 3/0688 |
| 2019/0065392 A1* | 2/2019 | Erez | G06F 12/0238 |

OTHER PUBLICATIONS

Chen et al. "KVFTL: Optimization of Storage Space Utilization for Key-Value-Specific Flash Storage Devices." Jan. 2017. IEEE. ASP-DAC 2017. pp. 584-590.*

Chen et al. "Internal Parallelism of Flash Memory-Based Solid-State Drives." May 2016. ACM. ACM Transactions on Storage. vol. 12. Article 13.*

* cited by examiner (Related Art)

DATA STORAGE DEVICE THAT STORES MULTIPLE VALUES CORRESPONDING TO MULTIPLE KEYS IN A PAGE

CROSS-REFERENCE TO RELATED APPLICATION

This application claims priority under 35 U.S.C. § 119 to Korean Patent Application No. 10-2018-0048519 filed on Apr. 26, 2018, in the Korean Intellectual Property Office, the disclosure of which is incorporated by reference herein in its entirety.

BACKGROUND

1. Field of the Disclosure

The present disclosure relates to a data storage device. More specifically, the present disclosure relates to a data storage device which minimizes data loss.

2. Description of the Related Art

In general, a semiconductor memory device is divided into a volatile memory device in which stored information is discontinued with interruption of power supply, and a non-volatile memory device capable of maintaining the stored information even when the power supply is interrupted. NAND flash devices are widely used as the non-volatile memory devices. The data storage medium made up of the NAND flash device includes, for example, an SSD (Solid State Drive). The SSD can achieve a large storage space and a high access speed, using the above-described NAND flash device.

A minimum writing unit of a general SSD device is a page unit. If the SSD device receives data of a magnitude (i.e., size) smaller than the page from the host, data received from the host is stored by processing the data to have a page unit. In such a case, there is a disadvantage that the storage space of the NAND flash device is not densely used. To overcome this disadvantage, a method of storing data of variable magnitude was introduced.

SUMMARY

An aspect of the present disclosure provides a data storage device which densely stores data in a non-volatile memory.

Another aspect of the present disclosure provides a data storage device that efficiently reads remaining data stored in advance, even when data is not stored in a specific memory due to an accidental accident.

According to some embodiments of the present disclosure, a data storage device includes a non-volatile memory and a controller. The non-volatile memory includes a first region and a second region different from the first region. The controller stores first and second data in a first region of the non-volatile memory. The first region of the non-volatile memory includes first and second storage regions. A part of the first data is stored in the first storage region. Another part of the first data is stored in the second storage region. The second data is stored in the second storage region, and an offset value of the second storage region in which the second data is started is stored in the second region of the non-volatile memory.

According to some embodiments of the present disclosure, a data storage device includes a non-volatile memory and a controller. The non-volatile memory includes first and second storage regions and a spare region. The controller stores first data in the non-volatile memory. When a magnitude of the first data is larger than a magnitude of a storable space of the first storage region, the controller divides the first data into first and second sub-data, stores the first sub-data in the first storage region, stores the second sub-data in the second storage region, and stores an offset value of the second storage region corresponding to a magnitude of the second sub-data in the spare region. When the magnitude of the first data is smaller than the magnitude of the first storage region, the controller stores the first data in the first storage region.

According to some embodiments of the present disclosure, a data storage device includes a non-volatile memory and a controller. The non-volatile memory includes a first storage region in which data is stored and a first spare region in which a first offset associated with the first storage region is stored. The controller reads first data at least partially stored in the first storage region and transmits the first data to outside. When the controller reads the first data, the controller refers to the first offset stored in the first spare region and scans the first storage region from the first offset to read the first data.

According to some embodiments of the present disclosure, a storage device includes a nonvolatile memory and a controller. The controller stores a first portion of first data within a first page of the nonvolatile memory and the first data includes first user data and first meta data. The controller stores a second portion, which differs from the first portion, of the first data within a second page of the nonvolatile memory that differs from the first page. The controller stores second data within the second page. And the controller stores, within a first offset storage region of the nonvolatile memory, a first offset value indicating a first terminus, with respect to a first base address with which the controller addresses the second page for accessing the second portion of the first data, at which the second data is stored.

The aspects of the present disclosure are not limited to those mentioned above and another aspect which is not mentioned may be clearly understood by those skilled in the art from the description below.

DETAILED DESCRIPTION OF THE EMBODIMENTS

Figure 1:
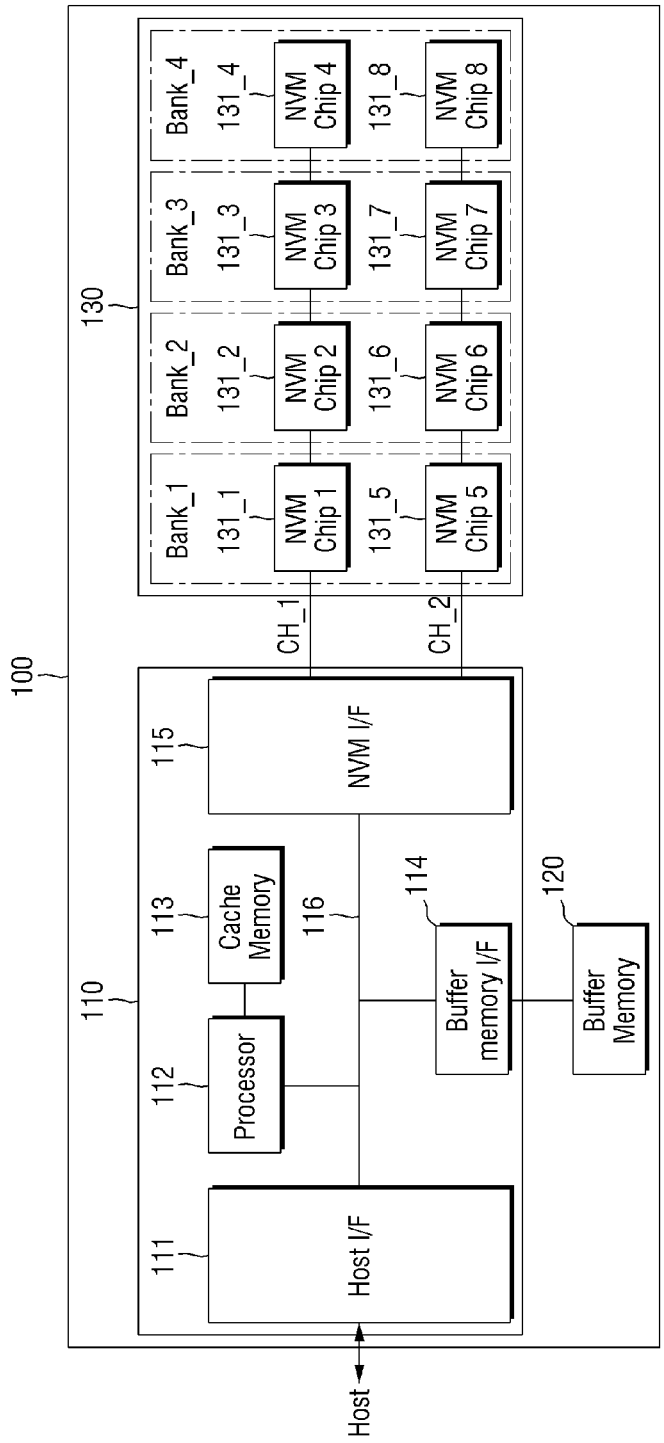
FIG. 1 is an example diagram for explaining a structure of a data storage device according to some embodiments.

FIG. 1 is an example diagram for explaining a structure of a data storage device according to some embodiments.

Referring to FIG. 1, the data storage device 100 may include a controller 110, a buffer memory 120, and a non-volatile memory 130 (NVM). In some embodiments, the data storage device 100 may be a solid-state drive (SSD), but the embodiments are not limited thereto.

The controller 110 may include a host interface 111, a processor 112, a cache memory 113, a buffer memory interface 114, a non-volatile memory interface 115, (NVM interface), and a bus 116.

The host interface 111 may be a transmission path for commands and/or data between the host and the data storage device 100. In some embodiments, the host interface 111 may be provided as, but is not limited to, a SATA (serial advanced technology attachment) interface, a SATAe (SATA express) interface, a SAS (serial attached small computer system interface (SCSI)) interface, a PCIe (peripheral component interconnect express) interface, an NVMe (non-volatile memory express) interface, an AHCI (advanced host controller interface) interface, or a multimedia card (MMC) interface.

The processor 112 may be a device or a program that performs data processing and/or calculation. In some embodiments, the processor 112 may be provided as hardware, such as a microprocessor or a central processing unit (CPU), but the embodiments are not limited thereto. For example, the processor 112 may be a program processor that translates a program language into a machine language. Although not illustrated in the drawings, the processor 112 may include a plurality of cores.

The cache memory 113 may be a memory that may temporarily store data in preparation for future requests so that it may access the data at high speed. The data stored in the cache memory 113 may be the result of a calculation executed previously. The cache memory 113 may be provided as a static RAM (SRAM: Static Random-Access Memory), a high-speed static RAM (Fast-SRAM) and/or a dynamic RAM (DRAM: Dynamic RAM), but the embodiments are not limited thereto. Also, even though FIG. 1 illustrates a case in which the cache memory 113 is separated from the processor 112, the embodiments are not limited thereto. For example, the cache memory 113 may be included inside the processor 112. Further, unlike the case illustrated in FIG. 1, the cache memory 113 may be provided as a hardware module independent from the controller 110. Although FIG. 1 illustrates a case where the cache memory 113 is directly connected to the processor 112, the embodiments are not limited thereto. For example, the cache memory 113 may be connected to the processor 112 via the bus 116.

The buffer memory interface 114 may include a protocol for performing data exchange between the controller 110 and the buffer memory 120. The non-volatile memory interface 115 may include a protocol for performing data exchange between the controller 110 and the non-volatile memory 130. The buffer memory interface 114 and the non-volatile memory interface 115 may be configured to communicate with the controller 110 via various interface protocols, such as a USB (Universal Serial Bus) protocol, an MMC (multimedia card) protocol, a PCI (peripheral component interconnection) protocol, a PCI-E (PCI-express) protocol, an ATA (Advanced Technology Attachment) protocol, a Serial-ATA protocol, a Parallel-ATA protocol, an SCSI (small computer small interface) protocol, an ESDI (enhanced small disk interface) protocol, an IDE (Integrated Drive Electronics) protocol, an NVMe (Non-volatile Memory express) protocols and a Query request protocol. However, the above-mentioned protocols are examples, and the present disclosure is not limited thereto.

The bus 116 may connect the host interface 111, the processor 112, the buffer memory interface 114, and the non-volatile memory interface 115. In other words, data and commands between the host interface 111, the processor 112, the buffer memory interface 114, and the non-volatile memory interface 115 may be moved to the respective components via the bus.

The controller 110 may control the overall operation of the data storage device 100. For example, the controller 110 may receive the data from the host and buffer the data in the buffer memory 120. Further, the controller 110 may generate an offset value as necessary and store it in the non-volatile memory 130. A specific description of the operation of the controller 110 will be provided later.

The buffer memory 120 may be a space which temporarily stores data before data is stored in the non-volatile memory 130. In other words, the buffer memory 120 may be a space for buffering data. For example, when data is received from the host, the received data may be temporarily stored in the buffer memory 120. The data stored in the buffer memory 120 may be flushed to the non-volatile memory 130 by specific commands or requests. The buffer memory 120 may include high-speed volatile memory or non-volatile memory. For example, the buffer memory 120 may be a single level cell (SLC) region of a dynamic RAM (DRAM), a static RAM (SRAM) or a flash memory, but the embodiments are not limited thereto.

The non-volatile memory 130 may temporarily store the received data. In other words, even if the power provided to the non-volatile memory 130 is cut off, the data stored in the non-volatile memory 130 may not be deleted. The non-volatile memory 130 may be a single level cell (SLC) or a multi-level cell (MLC) of the flash memory, but the embodiments are not limited thereto. For example, the non-volatile memory 130 may include a PC card (PCMCIA: personal computer memory card international association), a compact flash card (CF), a smart media card (SM, and SMC), a memory stick, a multimedia card (MMC, RS-MMC, and MMCmicro), an SD card (SD, miniSD, microSD, and SDHC), a universal flash storage device (UFS), an embedded multimedia card (eMMC), a NAND flash memory, a NOR type flash memory, a V-NAND type flash memory, and the like.

In some embodiments, the non-volatile memory 130 may include a plurality of non-volatile memory chips 131_1 to 131_8 (NVM chips). The non-volatile memory 130 may include first and second channels CH_1 and CH_2 and may include first to fourth banks Bank_1 to Bank_4. The first and second channels CH_1 and CH_2 of the non-volatile memory 130 may independently exchange data. In the first and second channels CH_1 and CH_2, the non-volatile memory chips adjacent to each other may be included in different banks. For example, the first and second non-volatile memory chips 131_1 and 131_2 of the first channel CH_1 may be included in different banks, that is, the first and second banks Bank_1, Bank_2, respectively.

However, the structure of the non-volatile memory 130 illustrated in FIG. 1 is merely an example, and the embodiments are not limited thereto. For example, in some embodiments, the non-volatile memory 130 may include four banks and eight non-volatile memory chips and may be provided as a single channel. In addition, although the non-volatile memory 130 of FIG. 1 is illustrated as including eight non-volatile memory chips 131_1 to 131_8, the embodiments are not limited to this number of non-volatile memory chips. A storage region and a spare region of the non-volatile memory will be described with reference to FIGS. 2 to 4.

Figure 2:
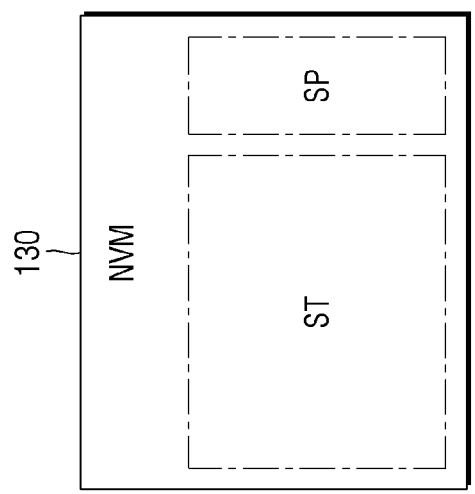
FIGS. 2, 3 and 4 are illustrative diagrams for explaining a storage region and a spare region of a non-volatile memory according to some embodiments.
Figure 3:
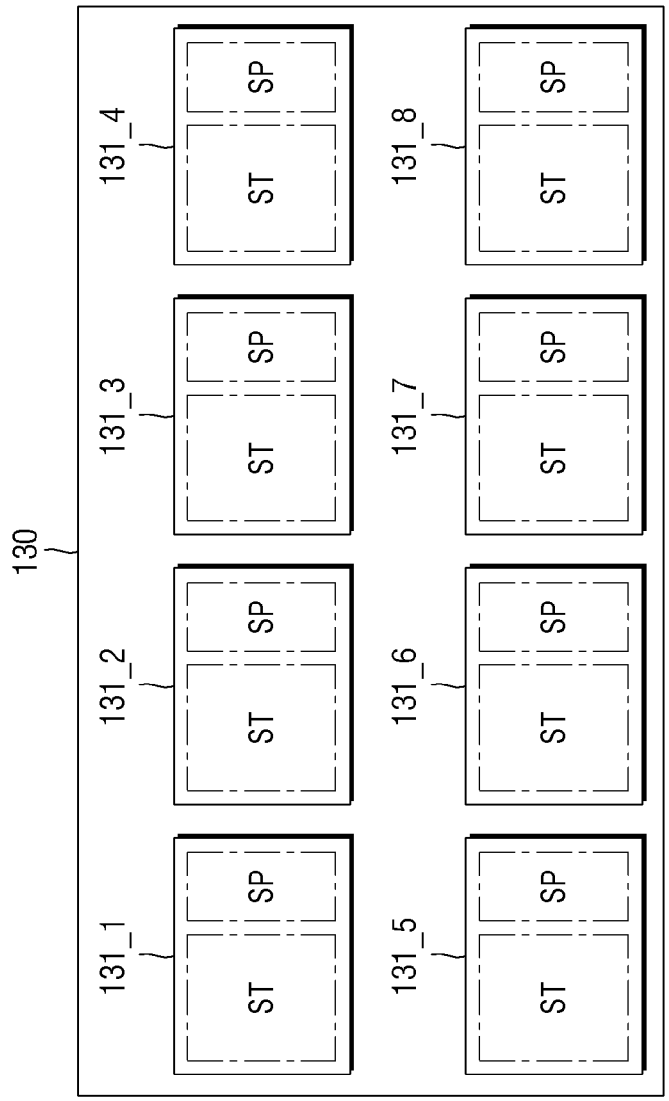
Figure 4:
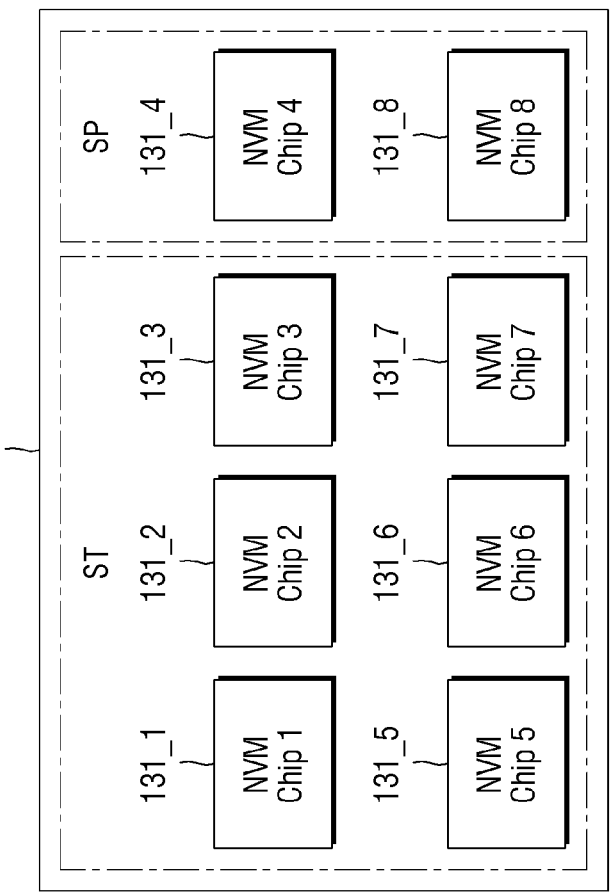

FIGS. 2 to 4 are illustrative diagrams for explaining the storage region and the spare region of the non-volatile memory according to some embodiments.

Referring to FIG. 2, the non-volatile memory 130 according to some embodiments may include a storage region ST and a spare region SP. The storage region ST of the non-volatile memory 130 may be a region in which the data received from the host is stored. The spare region SP of the non-volatile memory 130 may be a region in which error correction parity ECC parity and/or offset is stored.

The storage region ST and the spare region SP of the non-volatile memory 130 may be provided in various ways. Referring to FIG. 3, the non-volatile memory chips 131_1 to 131_8 according to some embodiments may include the storage region ST and the spare region SP, respectively. In other words, according to some embodiments, each of the non-volatile memory chips 131_1 to 131_8 may be divided into the storage region ST in which data is stored and the spare region SP in which offset is stored.

Referring to FIG. 4, some parts (131_1 to 131_3 and 131_5 to 131_7) of the non-volatile memory chips according to some embodiments may be included in the storage region ST of the non-volatile memory 130 and some other parts (131-4 and 131-8) of the non-volatile memory chips may be included in the spare region SP of the non-volatile memory 130. In other words, in some embodiments, the data may be stored in some parts (131_1 to 131_3 and 131_5 to 131_7) of the non-volatile memory chips and the offset may be stored in some other parts (131_4 and 131_8) of the non-volatile memory chips. That is, a person having ordinary knowledge in the technical field of the present disclosure may divide the non-volatile memory 130 into the storage region ST and the spare region SP in various ways.

Hereinafter, for convenience of explanation, the non-volatile memory 130 will be described by being divided into the storage region ST and the spare region SP, without being divided into the non-volatile memory chips 131_1 to 131_8.

A method of storing data of the data storage device 100 according to some embodiments will be described with reference to FIGS. 5 to 8.

Figure 5:
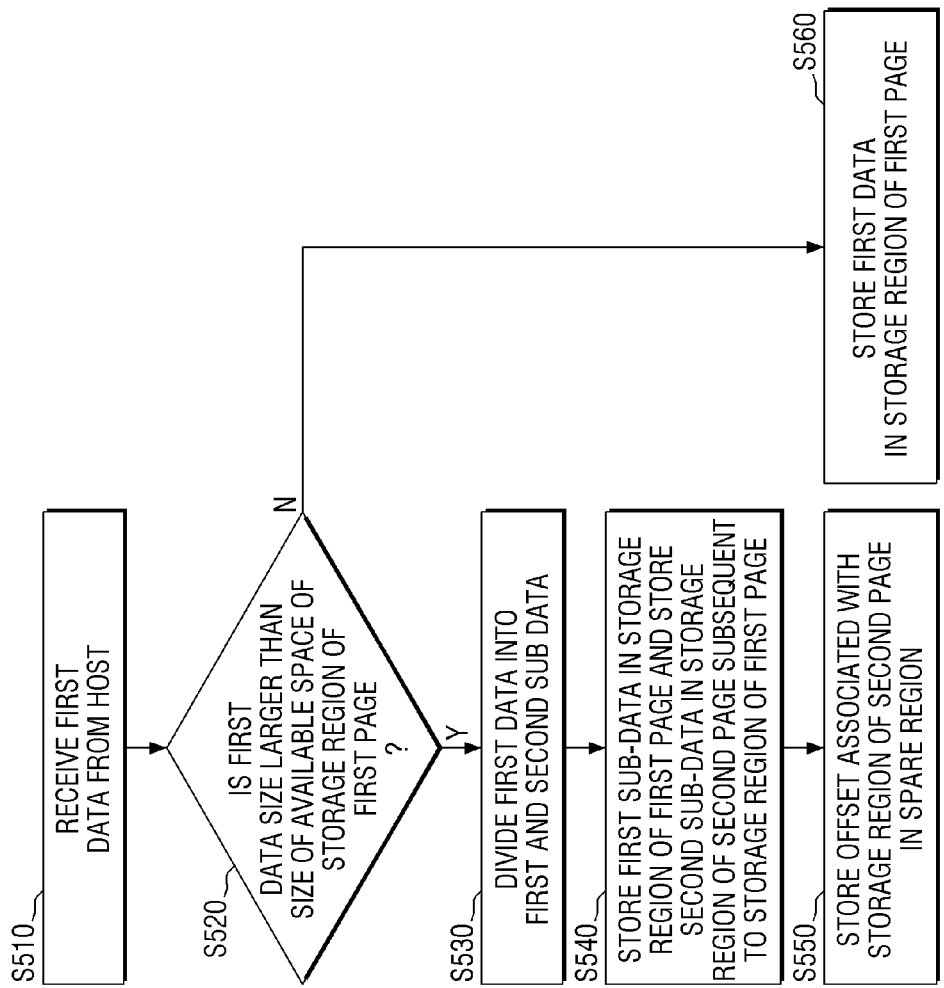
FIG. 5 is an example flowchart for illustrating a method of storing data received from a host, using the data storage device according to some embodiments.
Figure 6:
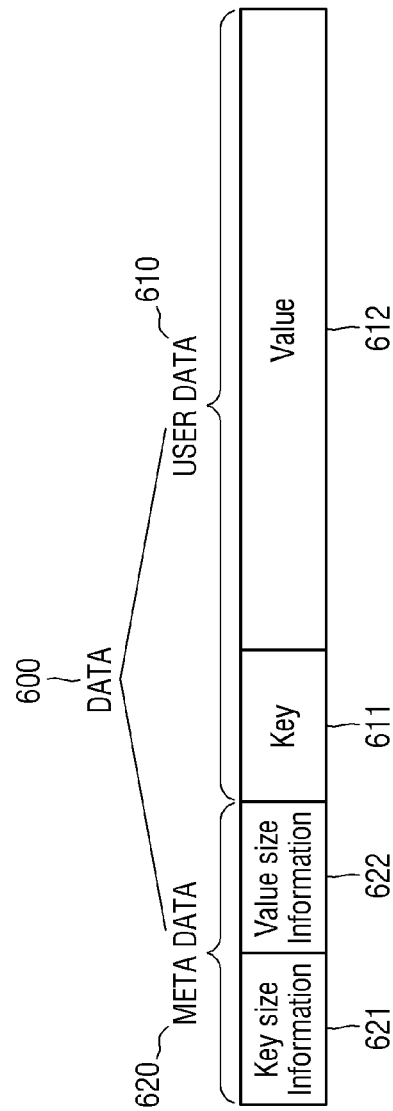
FIG. 6 is an example diagram for describing data stored in the non-volatile memory according to some embodiments.
Figure 7:
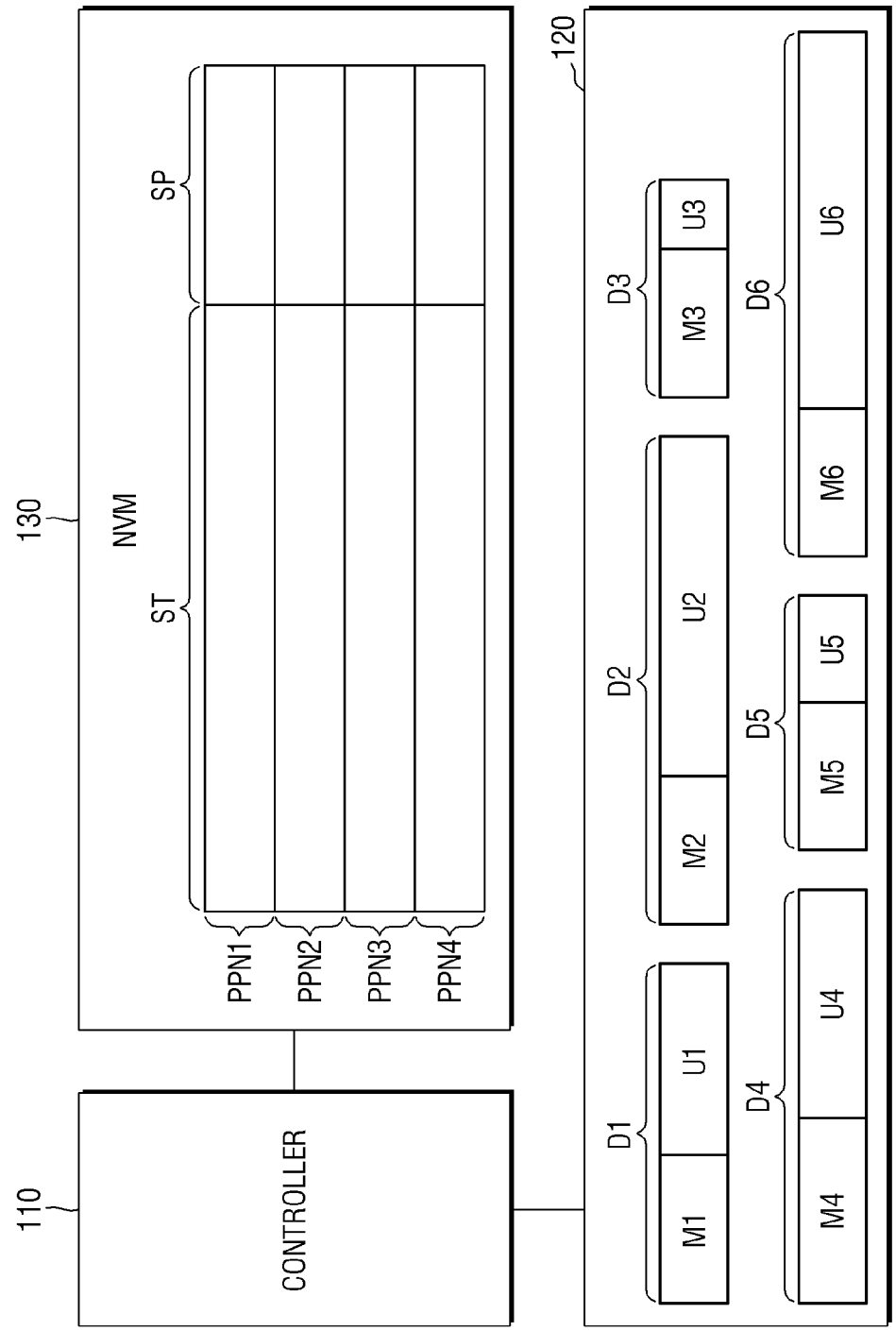
FIGS. 7 and 8 are illustrative diagrams for illustrating a method for storing data received from the host, using the data storage device according to some embodiments.
Figure 8:
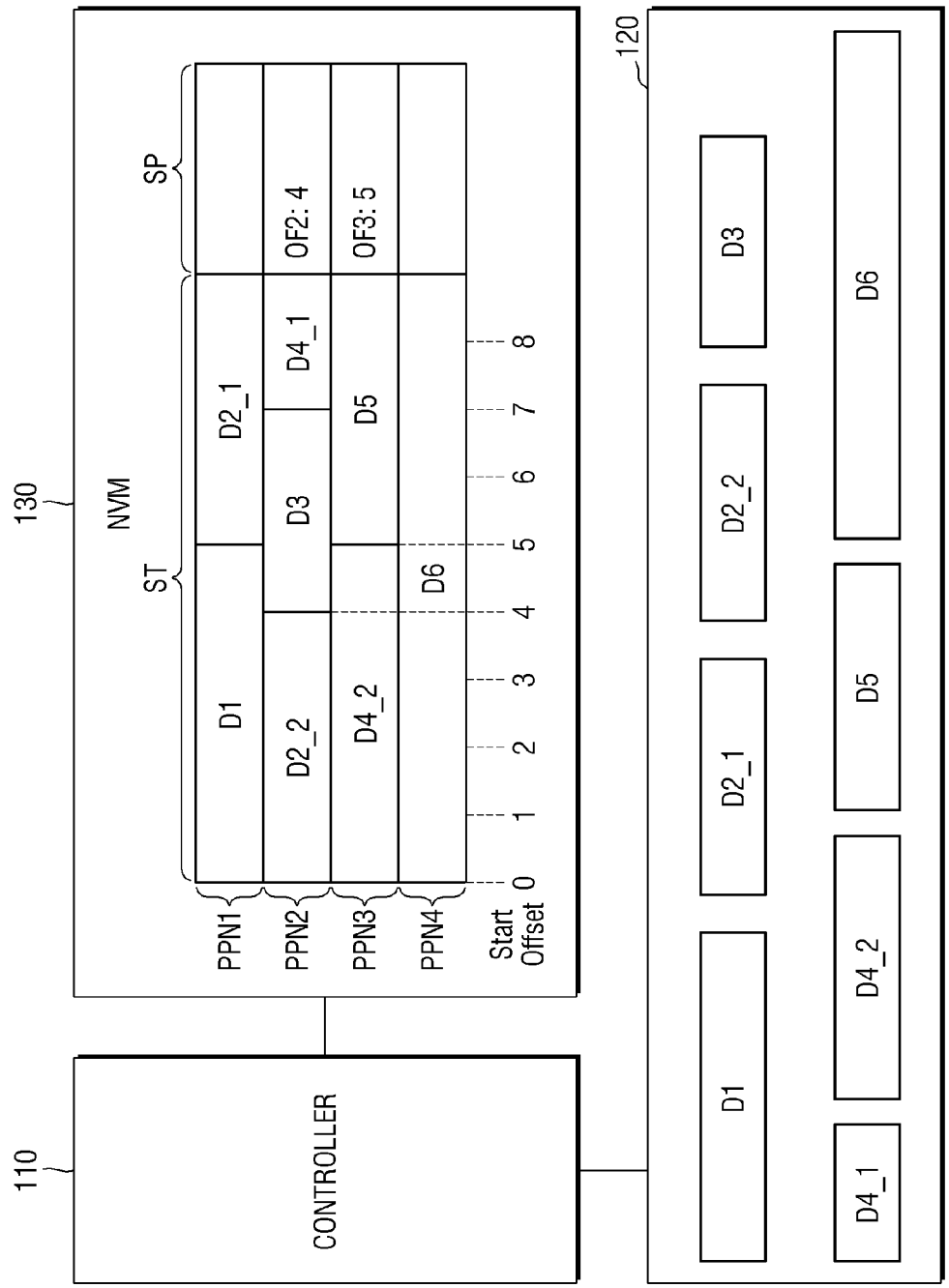

FIG. 5 is an example flowchart for illustrating a method of storing data received from a host, using the data storage device according to some embodiments. FIG. 6 is an example diagram for describing data stored in the non-volatile memory according to some embodiments. FIGS. 7 and 8 are illustrative diagrams for illustrating a method for storing data received from the host, using the data storage device according to some embodiments.

Referring to FIG. 5, first reception data to be stored in the non-volatile memory 130 may be received from the host (S510). For a better understanding, reference is made to FIG. 6.

Referring to FIG. 6, the data (600, DATA) may include user data 610 and meta data 620. The user data 610 may be data that the user attempts to store in the non-volatile memory 130. Further, the user data 610 may be data that the user attempts to load from the non-volatile memory 130. The meta data 620 may include information about the user data 610. For example, the meta data 620 may include information of a data magnitude (i.e., size) of the user data 610.

In some embodiments, the user data 610 may include key 611 data and value 612 data. The value 612 data may be a data value that the user attempts to store in the non-volatile memory 130. The key 611 data may be a value referenced to identify the value 612 data. The meta data 620 may include information 621 on the magnitude of the key 611 data and information 622 on the magnitude of the value 612 data. In some embodiments, the user data 610 is described as including the key 611 data and the value 612 data, but embodiments are not limited thereto. Also, in some embodiments, the meta data 620 is described as including information 621, 622 on the magnitude of the key 611 data and value 612 data, but the embodiments are not limited thereto.

Referring to FIG. 5 again, the controller 110 may compare the magnitude of the first reception data received from the host with the magnitude of storable space of the storage region of the first page of the non-volatile memory 130 in which the first reception data is stored (S520).

In some embodiments, if the magnitude of the first reception data is greater than the magnitude of the storable space of the first page of the non-volatile memory 130, the controller 110 may divide the reception data into first and second sub-data (S530). The controller 110 may store the first sub-data in the storage region of the first page of the non-volatile memory 130. Further, the controller 110 may store the second sub-data in the storage region of the second page of the non-volatile memory 130 subsequent to the storage region of the first page (S540). At this time, the controller 110 may store the offset of the storage region of the second page of the non-volatile memory 130, in which the second sub-data is stored, in the spare region SP (S550). The offset of the storage region of the second page may be a position at which the second reception data subsequent to the first reception data (second sub-data) in the storage region of the second page is started. That is, the offset of the storage region of the second page may correspond to the magnitude of the second sub-data. In some embodiments, the first reception data is stored from the storage region of the first page to the offset of the storage region of the second page, and the second reception data may be stored after the offset of the storage region of the second page.

In some embodiments, if the magnitude of the first reception data is smaller than or equal to the magnitude of the storable space of the storage region of the first page of the non-volatile memory 130, the first reception data may be stored in the storage region of the first page of the non-volatile memory 130 (S560). For a better understanding, reference is made to FIGS. 7 and 8.

Referring to FIG. 7, in some embodiments, the controller 110 may receive first to sixth data D1 to D6 from the host.

The controller 110 may buffer the first to sixth data D1 to D6, which are received from the host, in the buffer memory 120.

In some embodiments, the first to sixth data D1 to D6 may be data of different magnitudes (i.e., sizes), but the embodiments are not limited thereto. For example, the magnitudes of at least two of the first to sixth data D1 to D6 may be the same. The first data D1 may include first meta data M1 and first user data U1. Similarly, the second to sixth data D2 to D6 may include second to sixth meta data M2 to M6 and second to sixth user data U2 to U6, respectively. The first to sixth meta data M1 to M6 may include data magnitude (i.e., size) information on the first to sixth user data U1 to U6, respectively.

In some embodiments, the non-volatile memory 130 may include first to fourth physical pages PPN1 to PPN4. For the sake of convenience of explanation, it is assumed that each of the first to fourth physical pages PPN1 to PPN4 includes the storage region ST and the spare region SP, but the embodiments are not limited thereto. For convenience of description, offsets stored in the spare region SP of the first to fourth physical pages PPN1 to PPN4 are defined by first to eighth offsets OF1 to OF8, respectively.

In some embodiments, the first to fourth physical pages PPN1 to PPN4 may be included in the non-volatile memory chips (131_1 to 131_8 of FIG. 1) different from each other, respectively. For example, the first to fourth physical pages PPN1 to PPN4 may be included in the first to fourth non-volatile memory chips (131_1 to 131_4), respectively. In some other embodiments, at least some parts of the first to fourth physical pages PPN1 to PPN4 may be included in the same non-volatile memory chip (131_1 to 131_8 of FIG. 1). For example, the first and second physical pages PPN1 and PPN2 may be included in the first non-volatile memory chip 131_1. In addition, the third and fourth physical pages PPN3 and PPN4 may be included in the second non-volatile memory chip 131_2. Those having ordinary skill in the technical field of the present disclosure may provide the first to fourth physical pages PPN1 to PPN4 in various ways.

The controller 110 may consecutively store the first to sixth data D1 to D6 in the storage region ST of the non-volatile memory 130. In other words, the first to sixth data D1 to D6 may be consecutively stored over the storage regions ST of the first to fourth physical pages PPN1 to PPN4. Here, the expression "consecutively stored" means "spatially consecutively stored". That is, the expression "consecutively stored" is not limited to "consecutively stored in terms of time". For example, the second data D2 may be stored before the first data D1. That is, the first to sixth data D1 to D6 are spatially and consecutively stored over the storage regions ST of the first to fourth physical pages PPN1 to PPN4, and the first to sixth data D1 to D6 may be stored simultaneously, sequentially or in an arbitrary order in term of time.

Referring to FIG. 8, the first to sixth data D1 to D6 may be consecutively stored in the storage region ST of the first to fourth physical pages PPN1 to PPN4 of the first to fourth physical pages PPN1 to PPN4. According to some embodiments, the controller 110 compares the magnitude of the first data D1 with the magnitude of the storable space of the storage region ST of the first physical page PPN1. Since the magnitude of the first data D1 is smaller than the magnitude of the storable space of the storage region ST of the first physical page PPN1, the first data D1 may be stored in the storage region ST of the first physical page PPN1.

The controller 110 compares the magnitude of the second data D2 stored subsequent to the first data D1 with the magnitude of the storable space (i.e., remaining space) of the storage region ST of the first physical page PPN1. At this time, the magnitude of the storable space of the storage region ST of the first physical page PPN1 means the magnitude of the remaining space and does not include the magnitude of the space occupied by the first data D1. Stated another way, the magnitude of the storable space of the storage region ST is less than the full magnitude of the storage region ST of the first physical page PPN1. Since the magnitude of the second data D2 is larger than the magnitude of the storable space of the storage region ST of the first physical page PPN1, the controller 110 may divide the second data D2 into 2_1st sub-data D2_1 and 2_2nd sub-data D2_2. The controller 110 may store the 2_1st sub-data D2_1 in the storage region ST of the first physical page PPN1 and may store the 2_2nd sub-data D2_2 in the storage region ST of the second physical page PPN2. Further, the controller 110 may store the second offset OF2 of the storage region ST of the second physical page PPN2 in the spare region SP of the second physical page PPN2. For example, the second offset OF2 may be 4. In some embodiments, a location at which the third data D3 subsequent to the 2_2nd sub-data D2_2 starts in the storage region ST of the second physical page PPN2 may be the second offset OF2. In other words, the magnitude of the 2_2 sub-data D2_2 may be the second offset OF2.

The controller 110 compares the magnitude of the third data D3 subsequent to the second data D2, that is the 2_2nd sub-data D2_2, with the magnitude of the storable space (i.e., remaining space) of the storage region ST of the second physical page PPN2. At this time, the magnitude of the storable space of the storage region ST of the second physical page PPN2 means the remaining space, which excludes the magnitude of the 2_2nd sub_data D2_2 from the full magnitude of the storage region ST of the second physical page PPN2. Since the magnitude of the third data D3 is smaller than the magnitude of the storable space of the storage region ST of the second physical page PPN2, the third data D3 is stored beginning at the second offset OF2 in the storage region ST of the second physical page PPN2.

In the similar manner, the controller 110 may divide the fourth data D4 into 4_1st sub-data D4_1 and 4_2nd sub-data D4-2. The controller 110 may store the 4_1st sub-data D4_1 in the storage region ST of the second physical page PPN2 and may store the 4_2nd sub-data D4_2 in the storage region ST of the third physical page PPN3. Further, the controller 110 may store the third offset OF3 of the storage region ST of the third physical page PPN3 in the spare region SP of the third physical page PPN3. For example, the third offset OF3 may be 5.

The controller 110 may compare the magnitude of the fifth data D5 with the magnitude of the storable space of the storage region ST of the third physical page PPN3. Since the magnitude of the fifth data D5 is the same as the magnitude of the storable space of the storage region ST of the third physical page PPN3, the fifth data D5 may be stored in the storage region ST of the third physical page PPN3. In a similar manner, the sixth data D6 may be stored in the storage region ST of the fourth physical page PPN4. A method for reading the first to sixth data D1 to D6 by the controller 110 will be described with reference to FIGS. 9 to 12.

Figure 9:
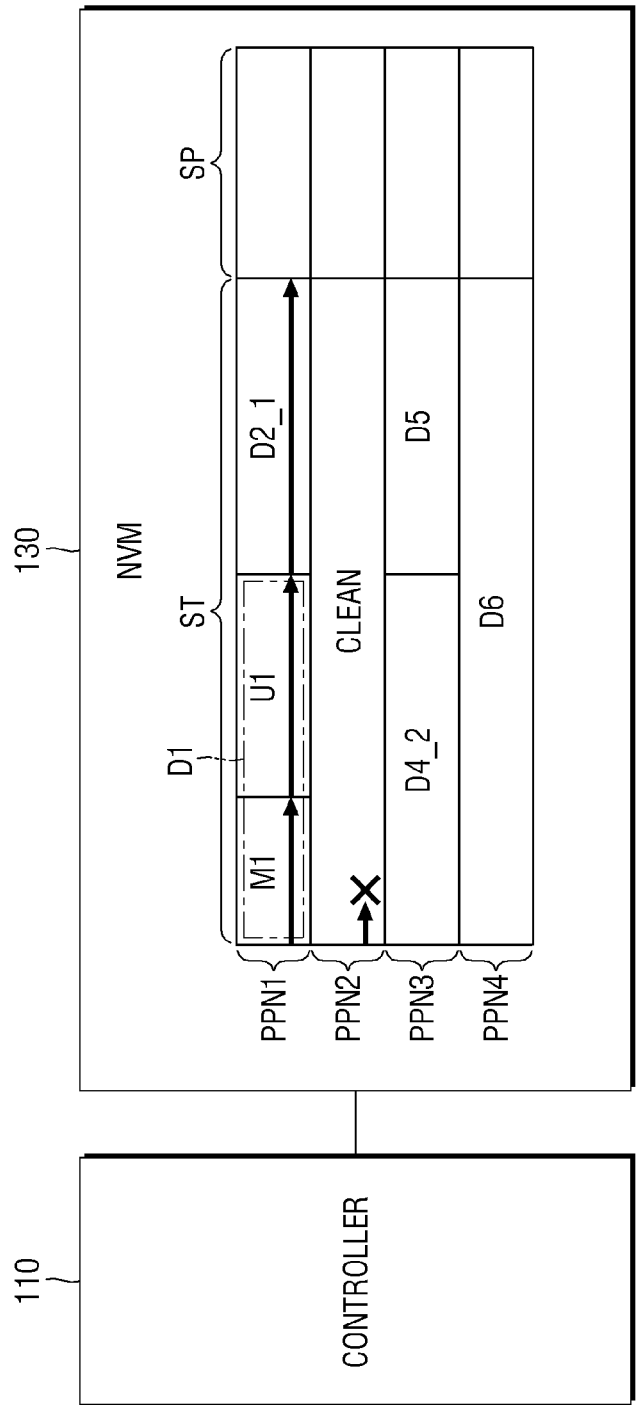
FIG. 9 is a related-art example diagram for explaining a problem that may occur when a controller reads the data stored in the non-volatile memory in a case where an offset is not stored.

FIG. 9 is a related-art example diagram for explaining a problem that may occur when the controller reads the data stored in the non-volatile memory in a case where the offset is not stored.

FIG. 9 illustrates a problem that may occur when a specific storage region is in a clean state and an offset of the storage region is not stored in the spare region. For convenience of explanation, it is assumed that the controller 110 has received the read command of the first to sixth data D1 to D6 from the host.

Referring to FIG. 9, the controller 110 according to some embodiments may scan the storage region ST of the first physical page PPN1 to read the first data D1. For example, the controller 110 may access the storage region ST of the first physical page PPN1 to read the first meta data M1. As described above, the first meta data M1 may include information on the first user data U1, for example, magnitude information on the first user data U1. Therefore, the controller 110 may obtain information on the magnitude of the first user data U1 with reference to the first meta data M1. The controller 110 may read the first data D1 on the basis of the information on the magnitude of the first user data U1.

In this way, the controller 110 attempts to read the second to sixth data, by scanning the storage regions ST of the remaining first to fourth physical pages PPN1 to PPN4.

However, in some embodiments, a specific storage region may be in a state in which data is not included, i.e., in a clean state. The clean state of a specific storage region may occur due to a sudden power-off (SPO). In other words, if the power supplied to the data storage device 100 is blocked due to an unexpected accident before the data to be stored in the specific storage region is stored, the specific storage region may be in a clean state of which data is not included.

As illustrated in FIG. 9, when the storage region ST of the second physical page PPN2 is in the clean state, the controller 110 may not read data from the storage region ST of the second physical page PPN2. Therefore, some data that need to be stored at least partially in the storage region ST of the second physical page PPN2 may be lost. That is, according to the drawing illustrated in FIG. 9, second to fourth data D2 to D4 that need to be stored at least partially in the storage region ST of the second physical page PPN2 may be lost. However, although the fifth and sixth data D5 and D6 are stored in the third and fourth physical pages PPN3 and PPN4, the controller 110 may not read the fifth and sixth data D5 and D6. This is because it is not possible to know the position at which the fifth data D5 is started in the storage region ST of the third physical page PPN3. Therefore, although actually lost data are the second to fourth data D2 to D4, the controller 110 may even fail to read the fifth and sixth data D5 and D6.

Figure 10:
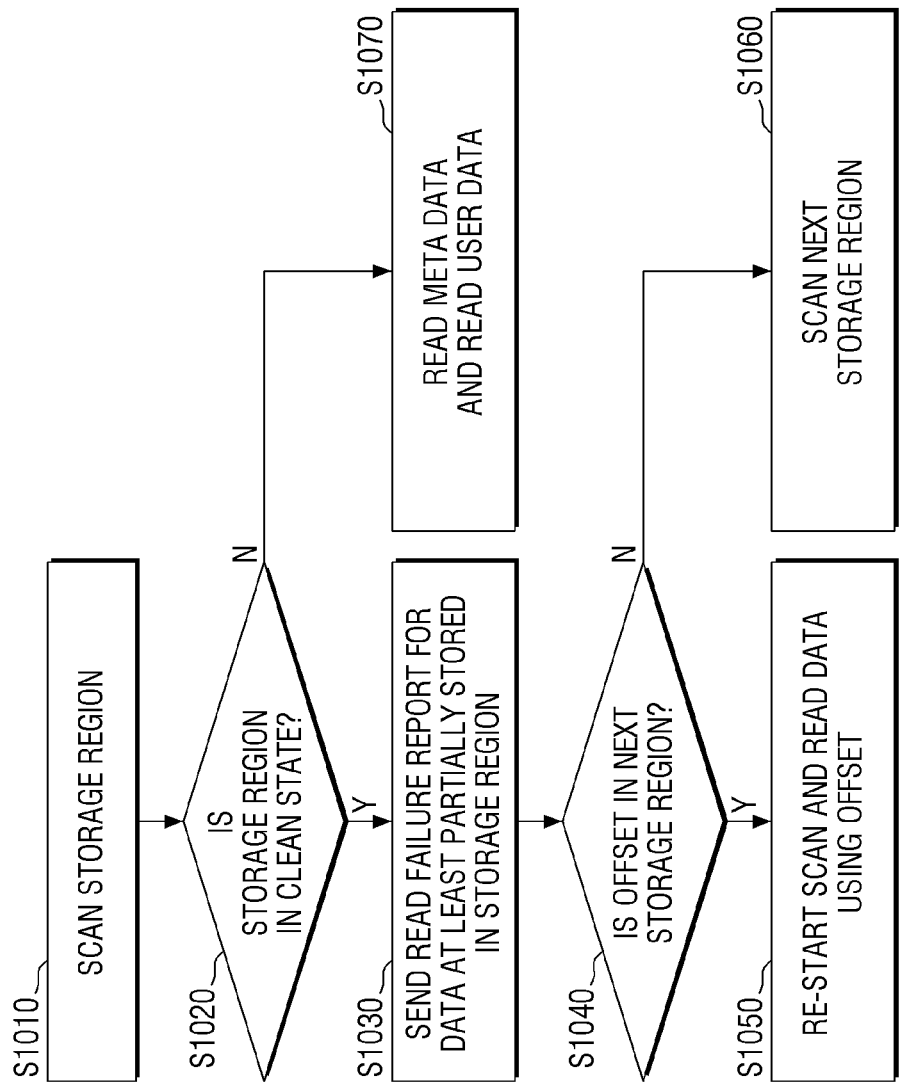
FIG. 10 is an example flowchart for illustrating a method for the controller of the data storage device according to some embodiments to read data stored in the non-volatile memory.
Figure 11:
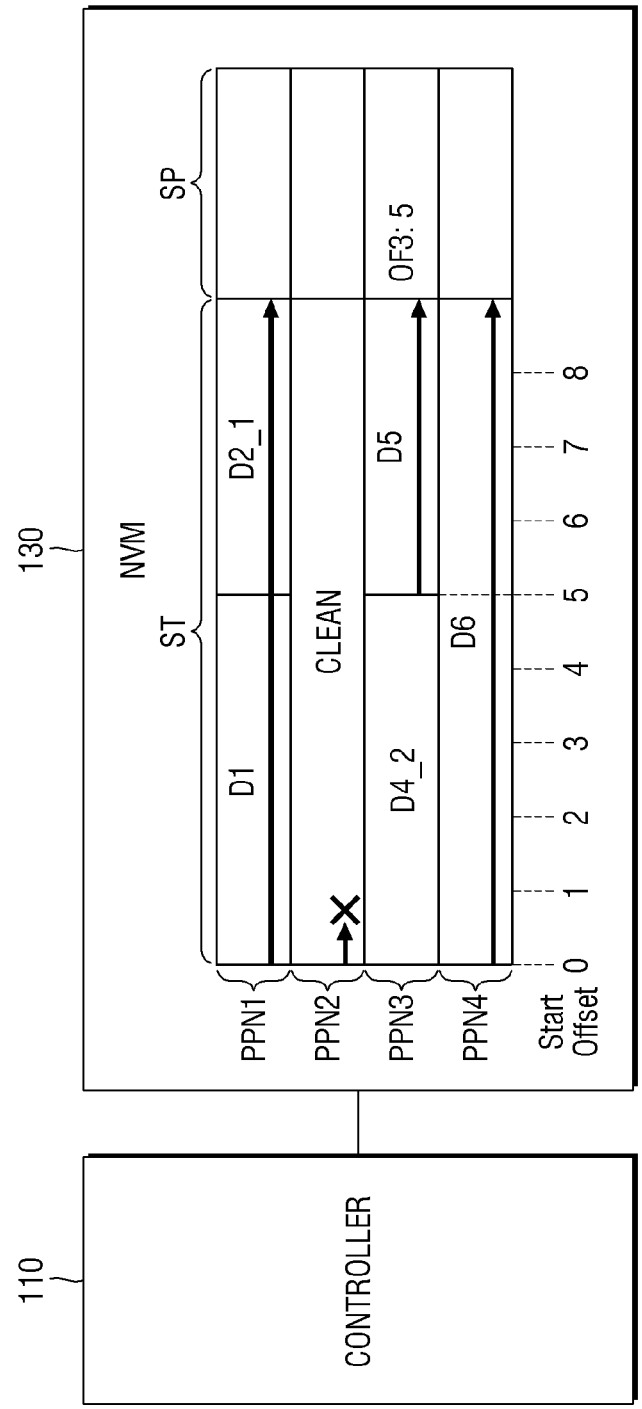
FIGS. 11 and 12 are illustrative diagrams for illustrating the method for the controller of the data storage device according to some embodiments to read data stored in the non-volatile memory.
Figure 12:
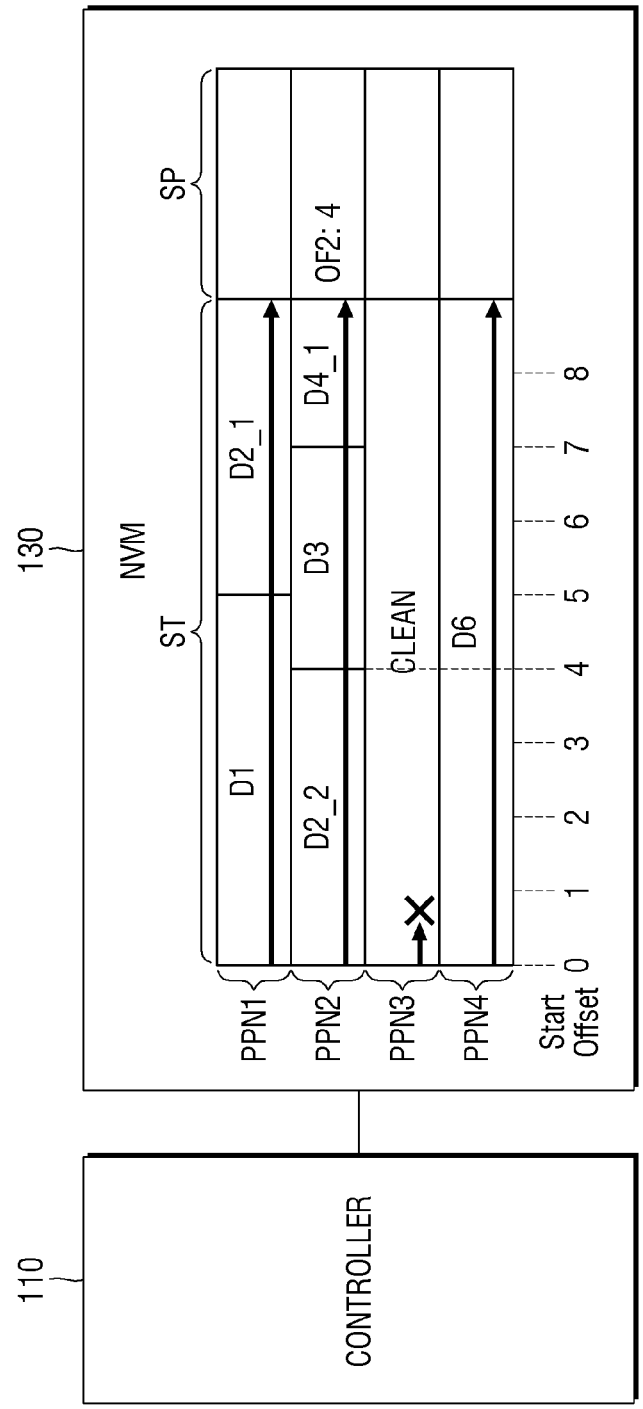

FIG. 10 is an example flowchart for illustrating a method for a controller of a data storage device according to some embodiments to read data stored in the non-volatile memory. FIGS. 11 and 12 are illustrative diagrams for illustrating the method for the controller of the data storage device according to some embodiments to read data stored in the non-volatile memory.

Referring to FIG. 10, in response to a command from the host, the controller 110 may read the data by scanning the storage region (S1010). At this time, the controller 110 may determine whether or not a specific storage region is clean (S1020).

In some embodiments, if the specific storage region is in a clean state, the controller 110 may transmit a read failure report of the data at least partially included in the specific storage region to the host (S1030). Subsequently, the controller 110 may determine whether there is an offset of a succeeding storage region to the specific storage region (S1040).

In some embodiments, if there is an offset of a subsequent storage region, the controller 110 may start scanning from the offset of the subsequent storage region to read the remaining data (S1050). For the sake of concrete explanation, the description will be made with reference to FIG. 11.

Referring to FIG. 11, the controller 110 may attempt to read the first to sixth data D1 to D6 by scanning the storage regions ST of the first to fourth physical pages PPN1 to PPN4. While scanning the second data D2, the controller 110 may determine that the storage region ST of the second physical page PPN2 is in the clean state. At this time, the controller 110 transmits a read failure report of the second to fourth data D2 to D4 at least partially stored in the storage region ST of the second physical page PPN2 to the host. The controller 110 may scan the storage region ST of the third physical page PPN3 subsequent to the storage region ST of the second physical page PPN2 having the clean state, thereby reading the fifth data D5. Specifically, the controller 110 may read the fifth data D5, by referring to the third offset OF3 stored in the spare region SP of the third physical page PPN3. That is, the controller 110 may scan the storage region ST of the third physical page PPN3 with the third offset OF3 as a starting point to read the fifth data D5. Subsequently, the controller 110 may scan the storage region ST of the fourth physical page PPN4 to read the sixth data D6.

Referring to FIG. 10 again, in some embodiments, if there is no offset of the subsequent storage region, the controller 110 may start scanning from the beginning of the subsequent storage region to read the remaining data (S1060). For the sake of concrete explanation, the description will be made with reference to FIG. 12.

Referring to FIG. 12, the controller 110 may scan the storage regions ST of the first to fourth physical pages PPN1 to PPN4, thereby attempting to read the first to sixth data D1 to D6. While scanning the fourth data D4, the controller 110 may determine that the storage region ST of the third physical page PPN3 is in the clean state. At this time, the controller 110 may transmit a read failure report of the fourth and fifth data D4 and D5 at least partially stored in the storage region ST of the third physical page PPN3 to the host. The controller 110 may scan the storage region ST of the fourth physical page PPN4 subsequent to the storage region ST of the third physical page PPN3 having the clean state to read sixth data D6. Specifically, since there is no offset stored in the spare region SP of the fourth physical page PPN4, the controller 110 may scan the beginning of the storage region ST of the fourth physical page PPN4 to read the sixth data D6.

Referring to FIG. 10 again, in some embodiments, if the specific storage region is not in the clean state, the controller 110 may read the first to sixth data D1 to D6 by referring to the first to sixth meta data M1 to M6 as described above (S1070).

FIGS. 13 to 16 are illustrative diagrams for explaining various methods of storing offsets in the non-volatile memory according to some embodiments. For the sake of convenience of explanation, repeated or similar contents will be omitted or briefly explained.

Figure 13:
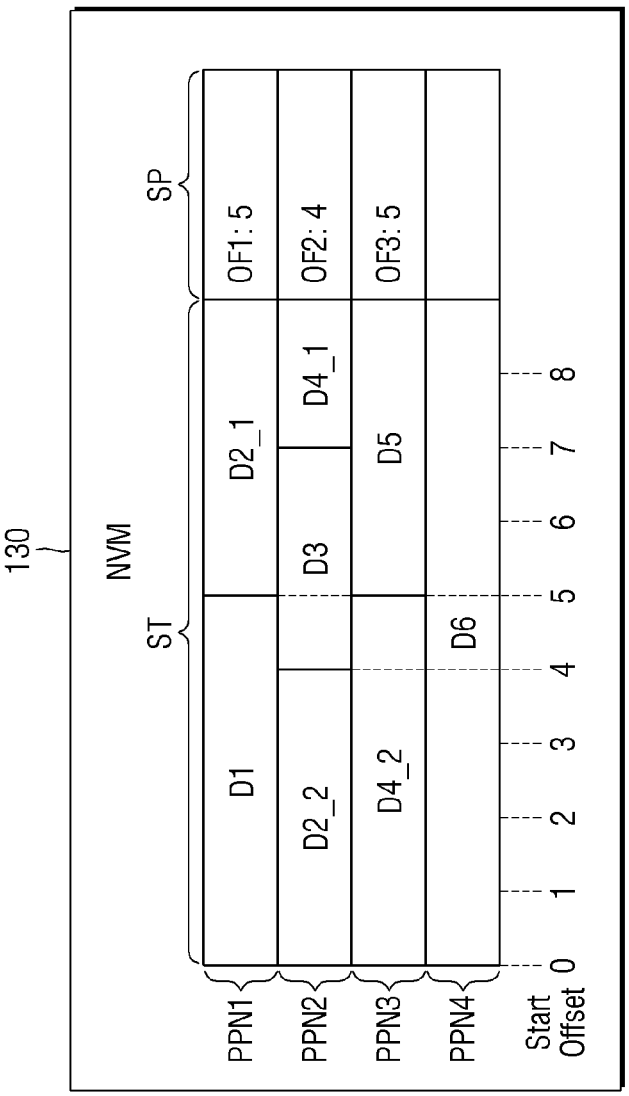
FIGS. 13, 14, 15, and 16 are illustrative diagrams for explaining various methods of storing offsets in the non-volatile memory according to some embodiments.

Referring to FIG. 13, in some embodiments, if two or more data are stored in the specific storage region of the non-volatile memory 130, the starting position of the second stored data may be stored in offset.

For example, the first data D1 and the 2_1st sub-data D2_1 may be stored in the storage region ST of the first physical page PPN1. The first offset OF1 which is the starting position of the 2_1st sub-data D2_1 may be 5. The first offset OF1 may be stored in the spare region SP of the first physical page PPN1. The 2_2nd sub-data D2_2, the third data D3, and the 4_1st sub-data D4_1 may be stored in the storage region ST of the second physical page PPN2. The second offset OF2 which is the starting position of the third sub-data D3 may be 4. The second offset OF2 may be stored in the spare region SP of the second physical page PPN2. The 4_2nd sub-data D4_2 and the fifth data D5 may be stored in the storage region ST of the third physical page PPN3. The third offset OF3 which is the starting position of the fifth data D5 may be 5. The third offset OF3 may be stored in the spare region SP of the third physical page PPN3. Since only the sixth data D6 is stored in the storage region ST of the fourth physical page PPN4, an offset may not be stored in the spare region SP of the fourth physical page PPN4.

Figure 14:
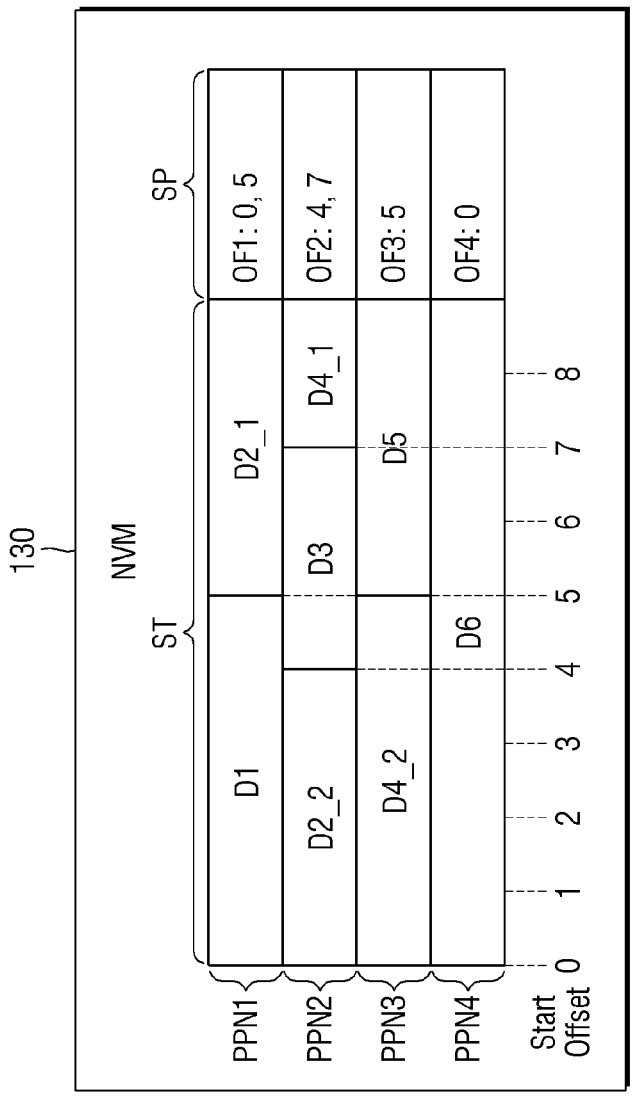

Referring to FIG. 14, in some embodiments, the starting position of all data stored in the non-volatile memory 130 may be stored as the offset in the spare region.

For example, the starting position of the first data D1, the 2_1st sub sub-data D2_1, the 2_2nd sub-data D2_2, the third data D3, the 4_1st sub-data D4_1, the 4_2nd sub-data D4_2, the fifth data D5, and the sixth data D6 may be stored in the respective spare regions. For example, the first offset OF1 may be 0 and 5. The second offset OF2 may be 4 and 7. The third offset OF3 may be 5. The fourth offset OF4 may be 0.

Figure 15:
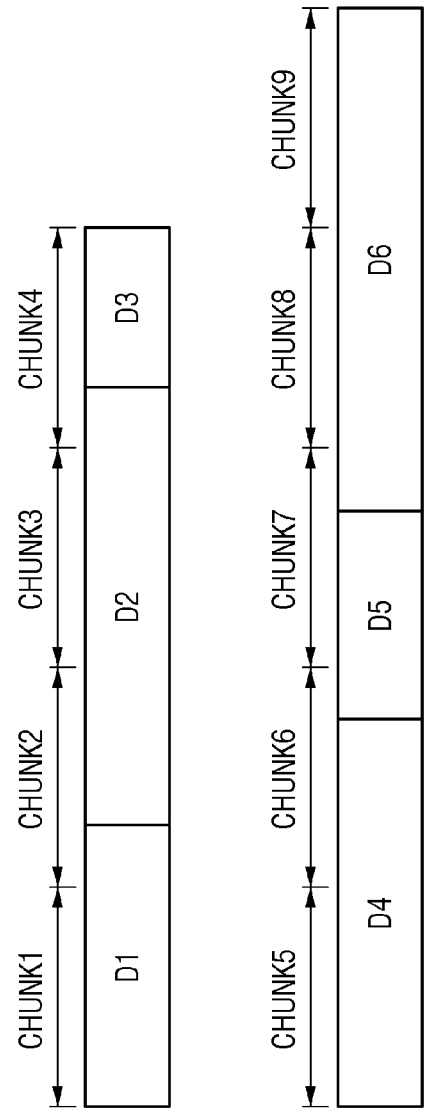
Figure 16:
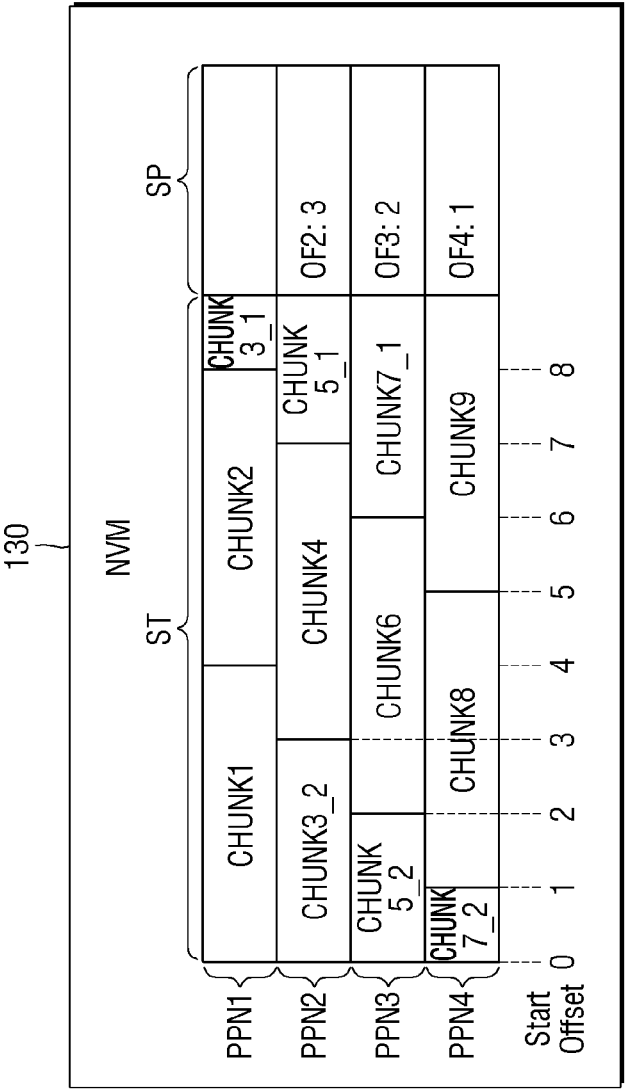

Referring to FIGS. 15 and 16, in some embodiments, the offset may be stored in the unit of error correction chunk (ECC Chunk). In other words, it is possible to rearrange the first to sixth data D1 to D6 to the first to ninth error correction chunks CHUNK1 to CHUNK8 and store the offset values in the above-described method. For example, the controller 110 may divide the third error correction chunk CHUNK8 into a 3_1st sub-data (CHUNK3_1) and a 3_2nd sub-data (CHUNK3_2), may divide the fifth error correction chunk CHUNK8 into a 5_1st sub-data (CHUNK5_1) and a 5_2nd sub-data (CHUNK5_2), and may divide the seventh error correction chunk CHUNK7 into a 7_1st sub-data (CHUNK7_1) and a 7_2nd sub-data (CHUNK7_2). As a result, the controller 110 may store the second to fourth offsets OF2 to OF4 in the second to fourth spare regions SP2 to SP4, respectively. For example, the second offset OF2 may be 3. The third offset OF3 may be 2. The fourth offset OF4 may be 1.

Figure 17:
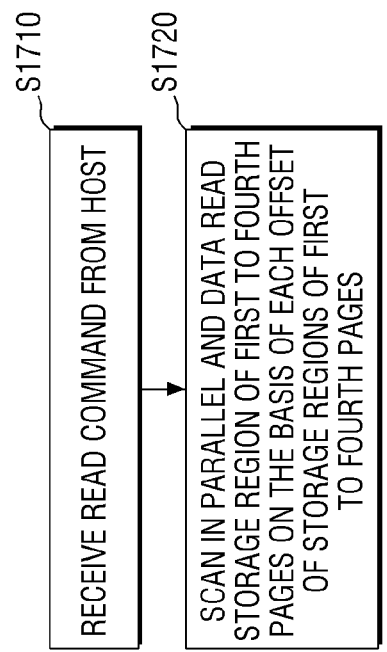
FIG. 17 is an example flowchart for explaining a method for the controller of the data storage device according to some embodiments to read data stored in the non-volatile memory.
Figure 18:
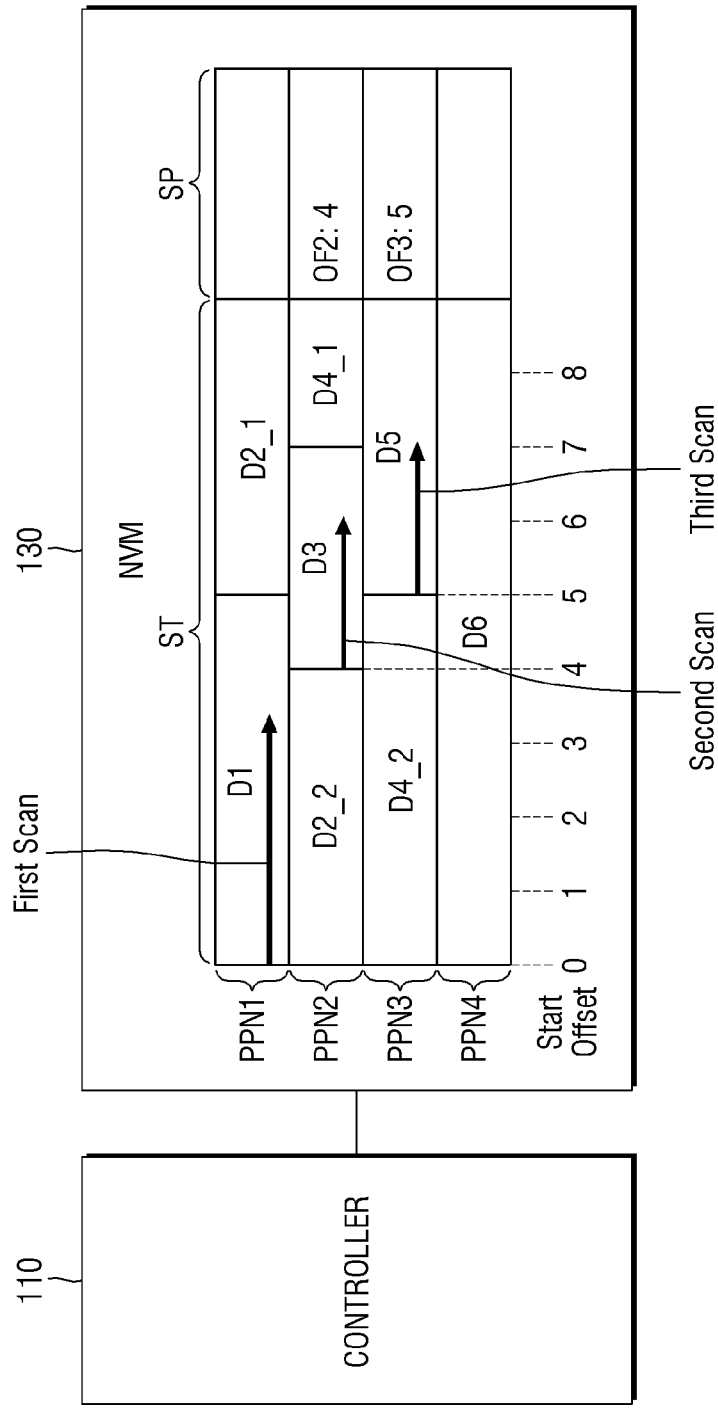
FIG. 18 is an example diagram illustrating a method for the controller of the data storage device according to some embodiments to read data stored in the non-volatile memory.

FIG. 17 is an example flowchart for explaining a method for a controller of a data storage device according to some embodiments to read data stored in the non-volatile memory. FIG. 18 is an example diagram illustrating a method for a controller of a data storage device according to some embodiments to read data stored in the non-volatile memory.

Referring to FIG. 17, the controller 110 may receive a data read command from the host (S1710). As a result, the controller 110 may scan and read a plurality of data in parallel, on the basis of the offset stored in the spare region SP of the non-volatile memory 130 (S1720). This will be described referring to FIG. 18.

In some embodiments, the controller 110 may receive the read commands of the first to sixth data D1 to D6 from the host. At this time, the controller 110 may perform a first scan from the beginning of the storage region ST of the first physical page PPN1. Further, the controller 110 may perform a second scan from the second offset OF2 of the storage region ST of the second physical page PPN2. Further, the controller 110 may perform a third scan from the third offset OF3 of the storage region ST of the third physical page PPN3. In other words, the controller 110 may read the first and second data D1 and D2 through the first scan.

Further, the controller 110 may read the third and fourth data D3 and D4 through the second scan. The controller 110 may read the fifth and sixth data D5 and D6 through the third scan.

In some embodiments, the controller 110 may perform the first to third scans in parallel. In other words, at least a part of the first to third scans may be executed at the same time. Although not illustrated, a processor 112 included in the controller 110 may include a plurality of cores, and each core may execute the first to third scans, respectively. In other words, the first to third scans may be executed in parallel by the plurality of cores included in the processor 112.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A data storage device comprising:
   a non-volatile memory including a first page including a first storage region and a second page including a second storage region and a spare region; and
   a controller which stores first data, second, and third data in the non-volatile memory, wherein:
   when a magnitude of the first data is larger than a magnitude of a storable space of the first storage region, the controller divides the first data into first and second sub-data, stores the first sub-data in the first storage region, stores the second sub-data in a first portion of the second storage region subsequent to the first storage region, stores the second data in a second portion of the second storage region subsequent to the first portion, stores the third data in a third portion of the second storage region subsequent to the second portion, stores an offset value of the second storage region corresponding to a magnitude of the second sub-data in the spare region, does not store an offset value corresponding to a start of the second sub-data within the second storage region, and does not store an offset value corresponding to a start of the third data within the second storage region, and when the magnitude of the first data is smaller than the magnitude of the first storage region, the controller stores the first data in the first storage region.

2. The data storage device of claim 1, wherein when the controller stores second data different from the first data in the second storage region, the controller stores the second data after the offset value of the second storage region.

3. The data storage device of claim 1, wherein:
the second storage region includes second data subsequent to the second sub-data,
when the controller receives a read command of the first data but the first storage region is in a clean state, the controller transmits a read failure message of the first data to an external host, and
when the controller receives a read command of the second data, the controller scans the second storage region from the offset value of the second storage region to read the second data.

4. The data storage device of claim 1, wherein:
the second storage region includes second data subsequent to the second sub-data, and
when the controller receives a read command of the first and second data, the controller scans:
the first storage region from a starting position of the first storage region to read a first portion of the first data,
the second storage region from a starting position of the second storage region to read a second portion of the first data, and
the second storage region from the offset value of the second storage region to read the second data.

5. The data storage device of claim 4, wherein the controller reads the first and second data in parallel.

6. A data storage device comprising:
a non-volatile memory including a first region and a second region different from the first region; and
a controller which stores first, second, and third data in a first region of the non-volatile memory, wherein:
the first region of the non-volatile memory includes a first storage region, a second storage region subsequent to the first storage region, and a third storage region subsequent to the second storage region,
the second region of the non-volatile memory includes a spare region,
a page of the non-volatile memory includes the second storage region and the spare region,
a part of the first data is stored in the first storage region,
another part of the first data is stored in the second storage region,
the second data is stored in the second storage region,
a part of the third data is stored in the second storage region,
another part of the third data is stored in the third storage region,
an offset value of the second storage region in which the second data is started is stored in the spare region of the non-volatile memory,
no offset value of the second storage region in which the other part of the first data is started is stored in the spare region of the non-volatile memory, and
no offset value of the second region in which the part of the third data is started is stored in the spare region of the non-volatile memory.

7. The data storage device of claim 6, wherein: the first data includes first user data and first meta data including data magnitude information of the first user data, and the second data includes second user data and second meta data including data magnitude information of the second user data.

8. The data storage device of claim 7, wherein the first user data includes first key data and first value data and the second user data includes second key data and second value data.

9. The data storage device of claim 8, wherein:
the first meta data includes data magnitude information on the first key data and data magnitude information on the first value data, and
the second meta data includes data magnitude information on the second key data and data magnitude information on the second value data.

10. The data storage device of claim 6, further comprising a buffer memory in which the first and second data are buffered.

11. The data storage device of claim 10, wherein when the controller stores the first data in the first region of the non-volatile memory, in a case where a magnitude of the first data is larger than a magnitude of a free space of the first storage region, the controller divides the first data into first and second sub-data, stores the first sub-data in the first storage region, stores the second sub-data in the second storage region, and stores the offset value of the second storage region in the second region of the non-volatile memory.

12. The data storage device of claim 6, wherein when the controller receives a read command of the first and second data, the controller:
scans the first storage region to read the part of the first data,
scans the second storage region to read the other part of the first data, and
scans the second storage region from the offset value of the second storage region to read at least a part of the second data.

13. The data storage device of claim 12, wherein the controller reads the first and second data in parallel.

14. The data storage device of claim 6, wherein when the controller receives a read command of the first data but the first storage region is in a clean state, the controller transmits a read failure message of the first data to an external host.

15. The data storage device of claim 14, wherein when the controller receives a read command of the second data, the controller scans the second storage region from the offset value of the second storage region to read the second data.

16. The data storage device of claim 1, wherein the controller stores an offset value of the first storage region in which the first data is started in the second region of the non-volatile memory.

17. A data storage device comprising:
a non-volatile memory which includes:
a first page which includes:
a first storage region in which first sub-data of first data is stored, and
a first spare region in which a first offset associated with the first storage region is stored;
a second page which includes:
a second storage region in which:
second sub-data of the first data is stored;
second data is stored subsequent to the second sub-data; and
third data is stored subsequent to the second data, and a second spare region storing:
   a second offset of the start of the second data within the second storage region, the second offset corresponding to a size of the second sub-data; and
   no offset value of the start of the third data within the second storage region; and
a controller which reads the first sub-data stored in the first storage region and transmits the first sub-data to an external host, wherein:
the second storage region is subsequent to the first storage region,
when the controller reads the first sub-data, the controller refers to the first offset stored in the first spare region and scans the first storage region from the first offset to read the first sub-data, and
when the controller reads the second sub-data, the controller does not refer to an offset stored in the first spare region.

18. The data storage device of claim 17, wherein:
the non-volatile memory further includes a third storage region, in which at least a part of second data is stored, and a second spare region,
the controller reads the second data and transmits the second data to the external host, and
when the controller reads the second data, in a case where there is no offset stored in the second spare region, the controller scans the third storage region from beginning of the third storage region to read the second data.

19. The data storage device of claim 17, wherein:
the non-volatile memory includes a third storage region, in which at least a part of second data is stored, and a second spare region in which a second offset associated with the third storage region is stored,
the controller reads the second data and transmits the second data to the external host, and
when the controller reads the second data, the controller refers to the second offset stored in the second spare region and scans the third storage region from the second offset to read the second data.

20. The data storage device of claim 19, wherein the controller reads the first data and the second data in parallel.

* * * * *